(12) United States Patent
Patel et al.

(10) Patent No.: US 10,769,115 B2
(45) Date of Patent: *Sep. 8, 2020

(54) DATA HANDLING

(71) Applicant: Microsoft Technology Licensing, LLC, Redmond, WA (US)

(72) Inventors: Mitesh Pankaj Patel, Bellevue, WA (US); Miko Arnab Sakhya Singha Bose, Seattle, WA (US); Simon Peter Clarke, Seattle, WA (US); David Oliver, Bellevue, WA (US); Andrew Watson, Seattle, WA (US); Ming-wei Wang, Redmond, WA (US); Steven Rayson, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 27 days.

This patent is subject to a terminal disclaimer.

(21) Appl. No.: 16/183,929

(22) Filed: Nov. 8, 2018

(65) Prior Publication Data

US 2019/0146953 A1     May 16, 2019

Related U.S. Application Data

(63) Continuation of application No. 14/179,462, filed on Feb. 12, 2014, now Pat. No. 10,157,186.

(60) Provisional application No. 61/847,993, filed on Jul. 18, 2013.

(51) Int. Cl.
  *G06F 16/18*     (2019.01)
  *G06F 16/182*    (2019.01)

(52) U.S. Cl.
  CPC .......... *G06F 16/182* (2019.01); *G06F 16/183* (2019.01)

(58) Field of Classification Search
  CPC ..................................................... G06F 16/182
  USPC ........................................................ 707/693
  See application file for complete search history.

(56) References Cited

U.S. PATENT DOCUMENTS

| | | | |
|---|---|---|---|
| 8,909,875 B1* | 12/2014 | Ostapovicz | G06F 3/0608 711/154 |
| 2011/0196900 A1* | 8/2011 | Drobychev | G06F 16/23 707/812 |
| 2012/0310890 A1* | 12/2012 | Dodd | G06F 16/113 707/646 |
| 2013/0111262 A1* | 5/2013 | Taylor | G06F 11/2005 714/4.11 |

* cited by examiner

*Primary Examiner* — Syling Yen
(74) *Attorney, Agent, or Firm* — Liang IP, PLLC

(57) ABSTRACT

The concepts relate to data handling, and more specifically to data handling scenarios where data is revised on one computer and stored on another computer. One example can obtain a set of blobs relating to revisions of a file. The example can determine a target size of datastore blobs. In an instance where a total size of the set of blobs is less than the target size, this example can aggregate the set of blobs into an individual datastore blob. Otherwise, the example can identify new or edited individual blobs of the set and aggregate the new or edited individual blobs into first datastore blobs. The example can also aggregate other individual blobs of the set into second datastore blobs.

20 Claims, 9 Drawing Sheets

DATA HANDLING

PRIORITY

This Utility Applications is a continuation of and claims priority to U.S. patent application Ser. No. 14/179,462, filed Feb. 12, 2014, which claims priority from U.S. Provisional Application No. 61/847,993, filed on Jul. 18, 2013, which is hereby incorporated by reference in their entirety.

BACKGROUND

For the last couple decades computing devices, such as personal computers were often designed to be relatively self-contained so that data could be created, stored, and revised on the same device. More recently, remote data storage has become more common. One particular driving force is that remote data storage was offered for free or at very low cost. Another driving force is that remote storage can make access to the data easier when multiple users and/or multiple devices are involved. However, remote storage is not without its disadvantages. One disadvantage is that some entity is incurring costs for the storage and the amount of data being stored is growing at a very fast rate. Another disadvantage, and one that is particularly irksome to users, is delay associated with sending and retrieving the data from the remote storage. Large amounts of data can overwhelm networks and cause user-perceptible delays and associated dissatisfaction.

SUMMARY

The described implementations relate to data handling, and more specifically to data handling where data is revised on one computer and stored on another computer. One example can obtain a set of blobs relating to revisions of a file. The example can determine a target size of datastore blobs. In an instance where a total size of the set of blobs is less than the target size, this example can aggregate the set of blobs into an individual datastore blob. Otherwise, the example can identify new or edited individual blobs of the set and aggregate the new or edited individual blobs into first datastore blobs. The example can also aggregate other individual blobs of the set into second datastore blobs.

Another example includes storage having instructions stored thereon and a processor configured to process the instructions. The example can also include a facilitator component configured to facilitate data transfer of a file between a client-side application and a host datastore according to client-side parameters and host datastore side parameters.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DETAILED DESCRIPTION

Overview

Figure 1:
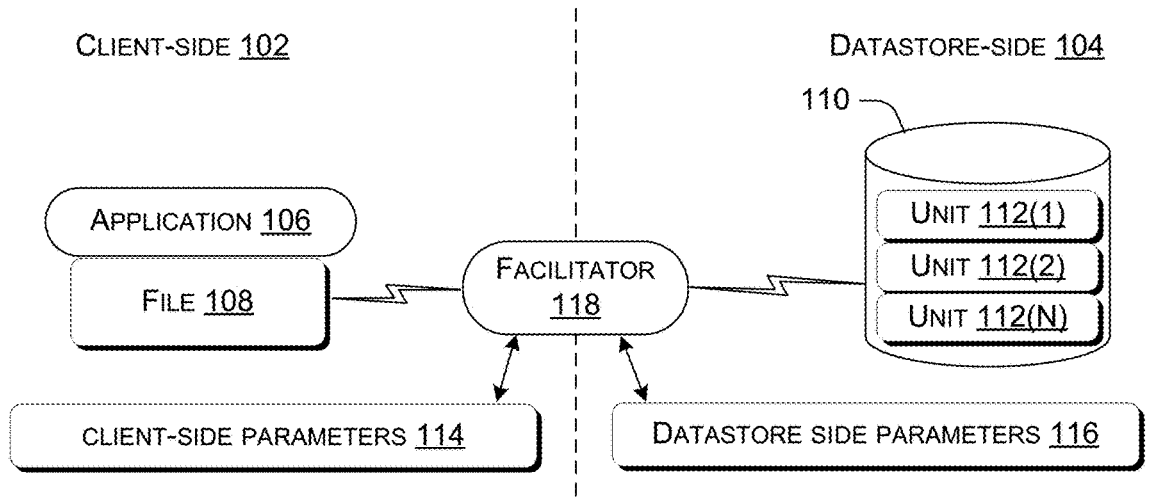
FIGS. 1-2 and 9-11 show examples of data handling systems in accordance with some implementations of the present concepts.

This patent relates to data handling and more specifically to facilitating data handling between a front-end (e.g., client) application or service and a back-end (e.g., host) data storage service. A user can create a file on the front-end service. The file can be stored on the back-end data storage service. The user and/or other users may make edits (e.g., changes) to the file. The edits are then written to the back-end service. The front-end service may not operate according to the same parameters as the back-end service. The present concepts accommodate these differences between the front-end and the back-end.

The present concepts can facilitate data handling in a manner that accommodates parameters of both the front-end and the back-end and facilitates interoperability. For example, one parameter can relate to a size of data units handled by the front-end service versus the back-end service. For instance, the front-end service may handle data units of a first smaller size, such as 4 kilobytes while the back-end service handles larger sizes, such as 1 megabyte units. (Note that examples of front end and back end unit sizes are provided for purposes of explanation. These examples are not intended to be limiting or inclusive. Rather, the examples serve to illustrate that the front-end service can operate independently of the back-end service. As such, it is not uncommon for the front-end service to employ different unit sizes that are different than the back-end sizes. Generally, the front-end unit sizes tend to be smaller than the back end unit sizes.)

The present implementations can allow the front-end service to operate in a normal manner (e.g., without regard to unit size differences between the front-end service and the back-end service). The present implementations can then repackage (e.g., aggregate) the front-end data units for the back-end service. In such a case, various techniques can be applied to determine which front-end data units to aggregate into individual data units for the back-end service. Stated another way, front-end units can be grouped strategically in order to decrease the amount of data that is transmitted over the network and/or stored on the back-end.

One consideration of these implementations can be to facilitate data handling so that the file operation costs are reduced compared to traditional configurations. For instance one file operation cost is a write cost for a file update operation. In this example the write cost reflects (e.g., is proportional to) the size of the changes made to the file and not the full file size of the file. From one perspective, cost can be thought of as the number of disk operations for a file write operation. Stated another way, incremental updates to a file stored on the back-end service can be handled such that the cost for updating the file is proportional to the size of the update. These concepts can also allow incremental and efficient storage of historical versions of a file, rather than saving each version of the file in its entirety.

Stated another way, historical versions of a file can utilize disk space proportional to the change in each version instead of saving a whole new version of the file. For instance, when historical versions of a specific file are stored, each historical version can be a delta change off the prior versions. Therefore disk space utilization of historical versions can be drastically reduced compared to existing techniques. These features can be implemented utilizing a 'shredded store' configuration to handle the file data. This aspect is discussed below.

Scenario Examples

FIG. 1 shows a system 100 that can implement the present concepts. For purposes of explanation, system 100 is separated into client-side 102 and datastore-side 104. The client-side 102 can include an application 106 that can operate on a file 108. The datastore-side 104 can include a datastore 110 that can store data as units 112(1)-112(N). The client-side can operate according to one or more client-side parameters 114. Similarly, the datastore-side 104 can operate according to one or more datastore-side parameters 116 that may be the same or different from the client-side parameters 114.

A facilitator 118 can function to allow the application 106 to operate on the file 108 without regard to the datastore 110. The facilitator 118 can also allow the datastore 110 to save the file as individual units 112 without regard to saving a complete file for every version generated by the application 106. Toward this end, the facilitator 118 may handle the file as a shredded store (introduced relative to FIG. 3). The process of operating on the file and saving the file may be repeated multiple times. Accordingly, the facilitator may process the file in a manner that is beneficial to the client-side 102 and/or the datastore-side 104 without interfering with the other of the client-side or the datastore-side. One such example is described in more detail below relative to FIG. 2.

Figure 2:
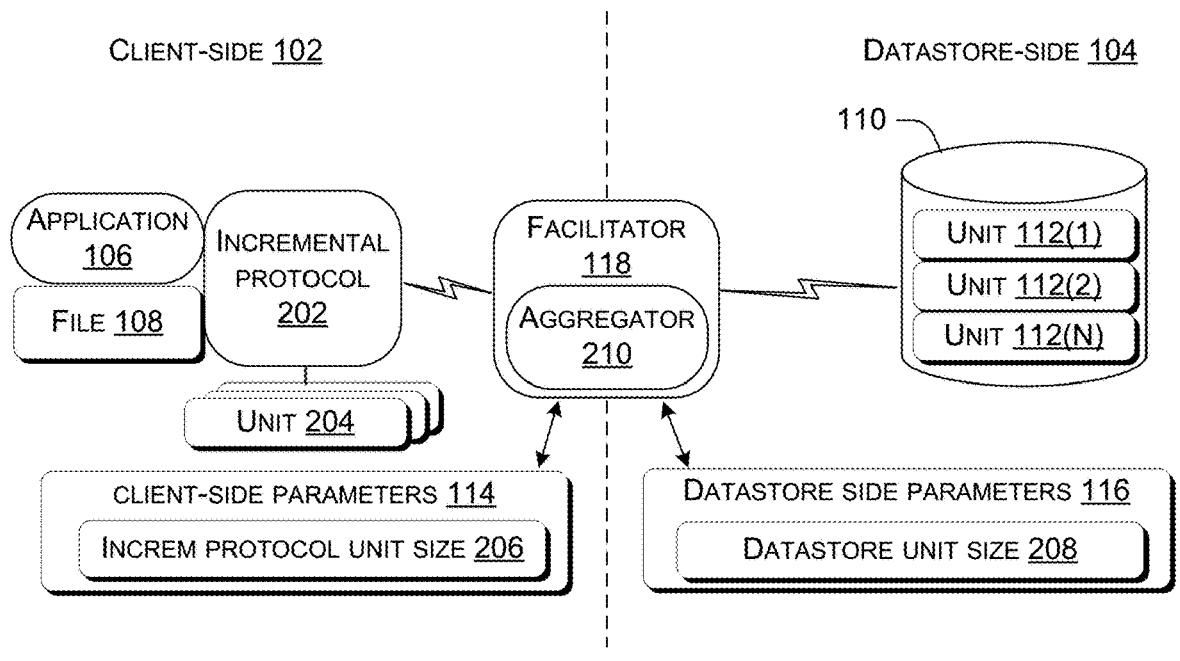

FIG. 2 shows a variation of system 100. In this case, an incremental protocol 202 can operate on the client-side 102 (e.g., in association with the client-side application 106). The incremental protocol 202 can divide the file 108 into units 204 and determine whether individual units are new, edited, or old (unchanged or stale). In some cases, the units 204 created by the incremental protocol can be characterized as chunks and/or blobs. The incremental protocol can define a unit size into which it divides the file (e.g., incremental protocol unit size 206). The incremental protocol unit size 206 can be considered as one of the client-side parameters 114. Examples of incremental protocols can include rsynch, remote differential compression, and ms-fsshttp (e.g., cobalt), among others.

Similarly, the datastore 110 may define what unit size it utilizes for storage (e.g., datastore unit size 208). The datastore unit size 208 may or may not match the incremental protocol unit size 206. For instance, the incremental protocol unit size 206 could be 4 kilobytes (KB) and the datastore unit size 208 could be 8 KB. In another example, the incremental protocol unit size 206 could be 16 KB and the datastore unit size 208 could be 1 megabyte (MB). (Of course, these examples are provided for purposes of explanation and are not intended to be limiting).

In this case, the facilitator 118 can include an aggregator 210 that can function to group incremental protocol units 204 together to approximate the size of the datastore unit size 208. Stated another way, the aggregator 210 can group together incremental protocol units 204 to approach but not exceed the size of the datastore unit size 208. For instance, if the incremental protocol unit size 206 is 8 KB and the datastore unit size 208 is 100 KB, the aggregator 210 could group 12 incremental protocol units into a 96 KB datastore unit. Thus, the aggregator 210 can allow the client and the incremental protocol 202 to operate in a transparent manner (e.g., unaltered) and the aggregator can customize output of the incremental protocol to satisfy the parameters of the datastore 110. Further, the aggregator can organize the units in a manner so that in edit scenarios, datastore writes tend to reflect the changed content of the file 108 rather than all of the content of the file. For instance, assume that three incremental protocol units 204 include changed content. These three units can be grouped together in one datastore side unit 112(1). These aspects are described in more detail below.

For purposes of explanation, assume a user wants to update file 108 that is stored in datastore 110. The application 106 requests file 108 so that the user can update the file. Briefly, upon completion by the user, the facilitator 118 and/or the aggregator 210 can process the update to the file to reduce the amount of data that is written back for that update. The facilitator 118 and/or the aggregator 210 can be file format agnostic and can process editable documents, such as word processing files, spreadsheet files, presentation files, etc. The facilitator 118 and/or the aggregator 210 can process non-editable files, such as postscript files. The facilitator 118 and/or the aggregator 210 can also process other files such as CAD files, PST files, and/or compressed files, such as ZIP files, among others.

In many instances, upon completion of the user edits on application 106, the incremental protocol 202 will process the file 108 into units 204 and communicate the units to the facilitator 118. The incremental protocol may also indicate what the changes are and where the changes are located (e.g., which units). However, in the absence of an incremental protocol, the facilitator 118 can unitize the file 108 and identify which units contain changes relative to the previous version. The aggregator 210 can look at the way the file is being updated and can group changes together to match the datastore side parameters 116, such as the datastore unit size 208. For instance, new and changed units can be grouped together and stale units can be grouped together by the aggregator. The grouped new and edited units can be used to populate new datastore units 112. These datastore side parameters 116 can be set by the datastore 110 so each different type of datastore can be customized. For instance, one datastore may store data as 100 MB units while another datastore may store data as one gigabytes (GB) units.

Figure 3:
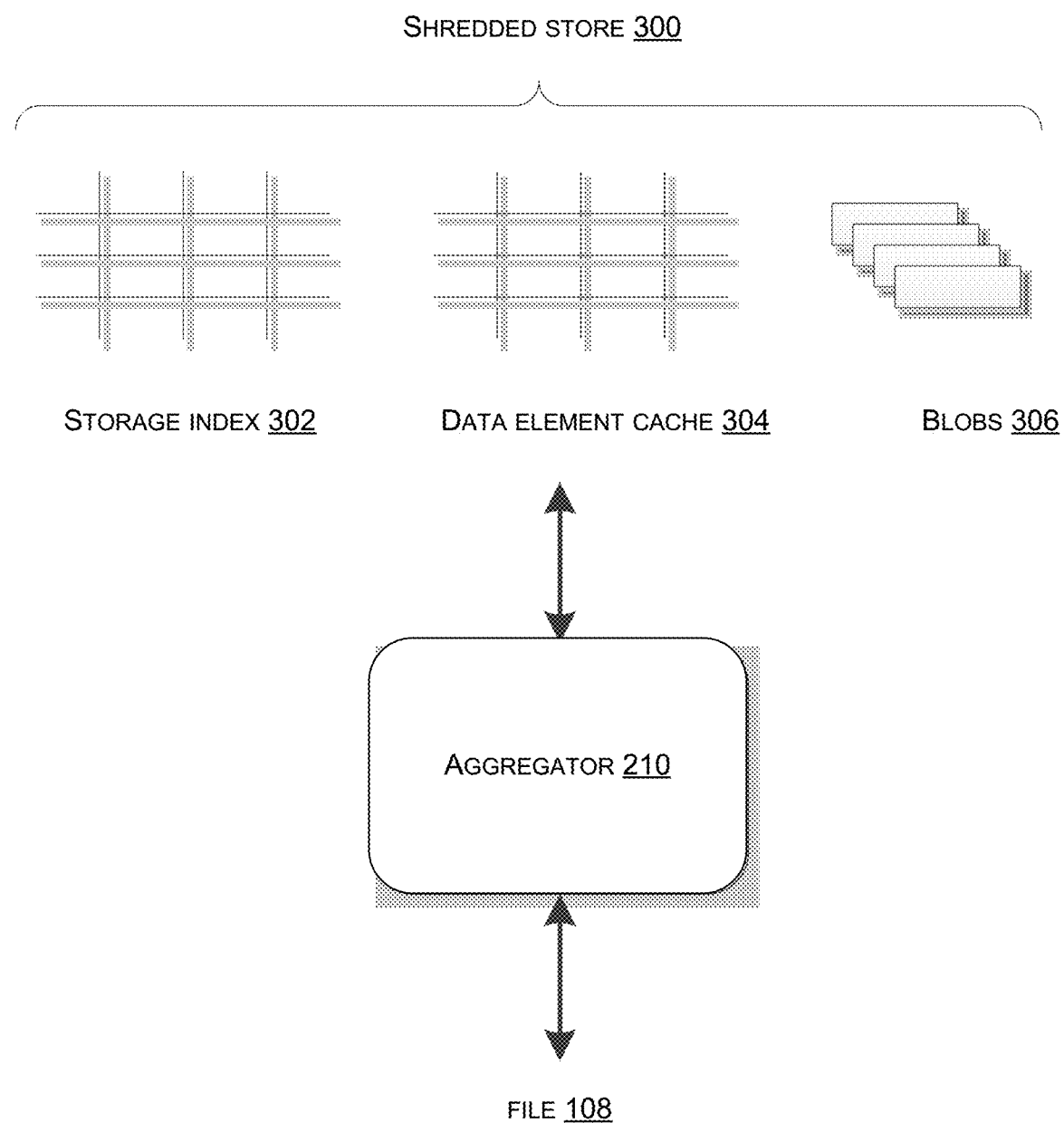
FIG. 3 shows a shredded store example in accordance with some implementations of the present concepts.

FIG. 3 shows one example of how file 108 can be managed with a shredded store 300. In turn, the shredded store can be leveraged by the aggregator 210. In this case, the shredded store includes a storage index 302, a data element cache 304, and blobs 306. Recall that a 'blob' is a non-limiting example of a data 'unit' as introduced above. Aggregator 210 can apply shredded store logic to the file 108, such as to read-write incremental protocol file data from the incremental protocol 202 (FIG. 2).

The shredded store 300 is designed to reduce the write cost of updating a file so that the write cost is (approximately) proportional to the size of the change, and not to the size of the file itself. When shredded, the data associated with file 108 is distributed across the blobs 306 (or other units) associated with the file. The independent blobs are each assigned a unique ID (offset) to enable reconstruction in the correct order when requested by a user. When a client updates (e.g., revises) the file, the shredded blob that corresponds to the change is updated on the datastore (FIG. 2).

In FIG. 3, the storage index 302 and data element cache 304 are represented as tables. For storage purposes, the storage index 302 and the data element cache 304 can be stored individually as single datastore blobs. When retrieved, these blobs can be loaded and handled as tables. Thus, blobs in the datastore used to store the storage index 302 and the data element cache 304 can be thought of as mutable whereas the blobs that store the file are immutable. As mentioned above, each data storage blob can have a unique ID. The storage index 302 can reference (e.g., map) a file position offset such that it is possible to fully recover the contents of the file by simply appending the blobs together in the correct order. Examples of fields that can be utilized in a ms-fsshttp based shredded store are listed below in table 1. Examples of operations that can be utilized in a ms-fsshttp based shredded store are listed below in table 2.

TABLE 1

| Field | Description |
| --- | --- |
| ID | Client defined 20-byte ExtendedGuid which uniquely identifies the blob. |
| Blob Sequence Number (BSN) | A UInt64 that sequences the creation of this blob with respect to all other blobs in the store. A new or updated blob must have a BSN greater than any other that has ever existed in the store. No two blobs in the same store may have the same BSN. |
| Group Id | 20-40 byte varbinary identifying the abstract 'group' to which this blob belongs. This will commonly be a CellId and used to make queries scoped to a specific cell more efficient. |
| File offset | A UInt64 specifying the offset in the end-user file. |
| Payload | The binary data of the blob. |

TABLE 2

| Operation | Description |
| --- | --- |
| Put Blobs | Persist new blobs to the back-end store. |
| Get Specified Blobs | Get new blobs from the back-end store. |
| Query Changes (new blobs) | Check for updates and get new data since previous query changes. |
| Delete Blobs | Delete data. |

Examples of transactional semantics in a ms-fsshttp based shredded store are discussed now. The state of the ms-fsshttp model is distributed across the set of blobs 306 in the shredded store 300. In some implementations, as incremental updates are made to the datastore, clients must always have access to a consistent view and there must be no possibility of inconsistencies (store corruption) because of partial or badly ordered commits.

Two example transaction support approaches are now described. In a first system with basic or limited transactional support, the system (in this implementation) must either confine updates to the transactional unit (e.g. put everything in a single blob) or use immutable constructs and perform strictly ordered updates, such that the system state is always consistent, despite an update being "in progress".

A second system can rely on richer transactional support within the datastore and make the change "directly" relying on the system to provide traditional ACID (atomicity, consistency, isolation, durability) support (e.g., the system guarantees that database transactions are processed reliably).

The shredded store 300 can unify the control metadata structures into a single structure that fully scales to design requirements and allows operations and optimizations to be performed. In one case, the structure can be a dictionary of (key, value) pairs with key lookup performance appropriate for random access (i.e., O(log n)) and support "inline" value sizes of up to 2 KB, with support for unlimited secondary sizes. As mentioned above, the example value sizes are provided for purposes of explanation and are not intended to be limiting. This implementation can use a B+ tree algorithm tuned for the SQL page size and blob overhead. For relatively small files (implementation dependent) this will yield a single control blob.

Arbitrary updates to the dictionary can be supported within a single transaction providing full ACID semantics. The master blob information can be stored in the value of a known key. The value can be written once and will be small enough to fit within the inline value storage threshold. The index blob info (e.g., the (key, value) pairs of the ms-fsshttp storage index) can be stored directly as (key, value) pairs in the dictionary. The data element cache (DEC) blob information can be manifest as the (key, value) pairs that represent the cached data elements. The pairs can be stored directly as (key, value) pairs in the dictionary.

The underlying data structure provided by the DEC 304 can be a set of (key, value) pairs with key lookup performance appropriate for random access (i.e., O(log n)).

As listed in table 3, for every data element (DE) stored there exists an entry in the DEC 304 as follows:
Key DataElementId of the DE (20-byte ExtendedGuid)
Value Encoded Fields:

TABLE 3

| DataElementType | The type of the DE (e.g. StorageManifest). |
| --- | --- |
| Location | Is this DE in the immediate backing store or the aggregate? |
| Serialized Size | The size, in bytes, of the full serialized DE blob. |
| Child Data Element References | List of the DataElementIds of the DEs referenced by this DE. |
| Child Key References | List of the keys in the storage index referenced by this DE. |

Blob Aggregation

Blob aggregation is an aspect of the shredded store that can be accomplished by the aggregator 210 or other component(s).

In this case, the shredded store files are shredded (e.g., divided) into (client) blobs (e.g., units 204 of FIG. 2). For instance, the incremental protocol (in this example ms-fsshttp) can perform the shredding. (Note that while an example that utilizes ms-fsshttp as the incremental protocol is described here in detail for purposes of explanation, the present concepts can be applied to other incremental protocols.) These client blobs can be of widely different sizes and many of them may be very small (<5 KB). The datastore for these client blobs can have its own specific read/write characteristics that make storing the client blobs as individual units very inefficient. The inefficiencies can lead to long request processing times and dramatic increases in disk 10. To overcome these inefficiencies the method can package the client blobs into larger datastore blobs (e.g., units 112 of FIG. 2) with a target datastore blob size (e.g., datastore unit size 208 of FIG. 2). The target blob size can be dependent on the read/write characteristics of the datastore 110 (FIG. 2), among other constraints/parameters. Throughout the lifecycle of a file, the blobs can be treated as immutable. Therefore, in some implementations the datastore only performs adds and deletes.

This configuration can provide a simple and efficient packaging algorithm/implementation to package client blobs as datastore blobs. When committing a change to a file, ms-fsshttp can translate the change to a set of blob adds and deletes that is proportional to the size of the change, not the size of the file. The resulting computation and datastore writes can also be proportional to the size of change. Further repeated changes to one part of the file results in logically localized writes in the datastore. This configuration lends itself to usage scenarios where lots of small edits are committed on the file.

In some implementations, when committing a change to a file, ms-fsshttp generates different types of datastore blobs. Each type of datastore blob is identified by a tag. Each datastore blob can also have a change frequency. Datastore blobs of different types or change frequencies can be packaged separately. When ms-fsshttp wants to make a change to the underlying datastore it first asks the blob aggregator 210 to create an update object U. Then ms-fsshttp issues a series of blob addition and deletion calls on U followed by asking U to finalize the update. The finalization operation returns a mapping of client blobs to datastore blobs. The mapping relates new client blobs and undeleted client blobs in datastore blobs containing deleted client blobs. Ms-fsshttp then merges this mapping into the existing mapping. The new mapping is then persisted in a fixed known host (e.g., datastore) blob.

The aggregator 210 then performs the finalization operation. The finalization operation processes the new datastore blobs and the datastore blobs are to be deleted as follows. First, find the minimal set D of datastore blobs containing the client blobs to be deleted. The operation can remove these datastore blobs. The remaining datastore blobs in D are called the existing blobs. Second, if the total size of existing client blobs and new client blobs is less than the target datastore blob size, the aggregator puts them into one datastore blob. This one datastore blob can then be written to the datastore. Alternatively, the existing client blobs and new client blobs can be packed separately into two disjoint sets of datastore blobs.

In one implementation, a 'best fit decreasing' algorithm can be employed as the packing algorithm. In this case, the output of the packing algorithm is a set of datastore blobs. The aggregator 210 can extract a set of mappings that map client blobs to their datastore blobs. This set of mappings can be returned to the caller.

One example of the best fit decreasing algorithm can include sorting the set of client blobs to pack into a list L in decreasing order. So the first client blob of L is the largest one. A sorted dictionary R can be maintained. The sorted dictionary can include a list of datastore blobs sorted by the total size of their contained client blobs in increasing order. So the first datastore blob of H is the current smallest datastore blob. Initially this dictionary is empty. Upon subsequent file activity, the technique can remove the first client blob B of L. Next the technique can find the last datastore blob H in R such that H will remain under the target datastore blob size if B is added to H. If H exists in R then add B to H. Otherwise create a new datastore blob, add B to it, then add the new datastore blob to R. The technique can repeat this step until L is empty. At this point R contains the set of datastore blobs to be written to the datastore.

To summarize, the best fit decreasing packing algorithm is simple yet can achieve desired results. The described implementation is efficient in the sense that on average it does an order of change size computation, not order of file size computation. The resulting datastore blob writes to the datastore is also on average the order of change size, not order of file size. Finally for changes that are smaller than the target datastore blob size, the change can be written as a single datastore blob. From one perspective, some implementations of the present concepts can treat the datastore side blobs as immutable. Further, these implementations can keep 'changing blobs' separate from 'static blobs' to reduce instances where static data has to be processed. These configurations can reduce or eliminate maintenance of datastore side blobs.

Shredded Store—Versioning

As mentioned above, the shredded store design can allow a data stream to be represented as a collection of blobs. Some implementations can efficiently store multiple related data streams by doing a shallow copy of references instead of a deep copy of actual data.

Figure 4:
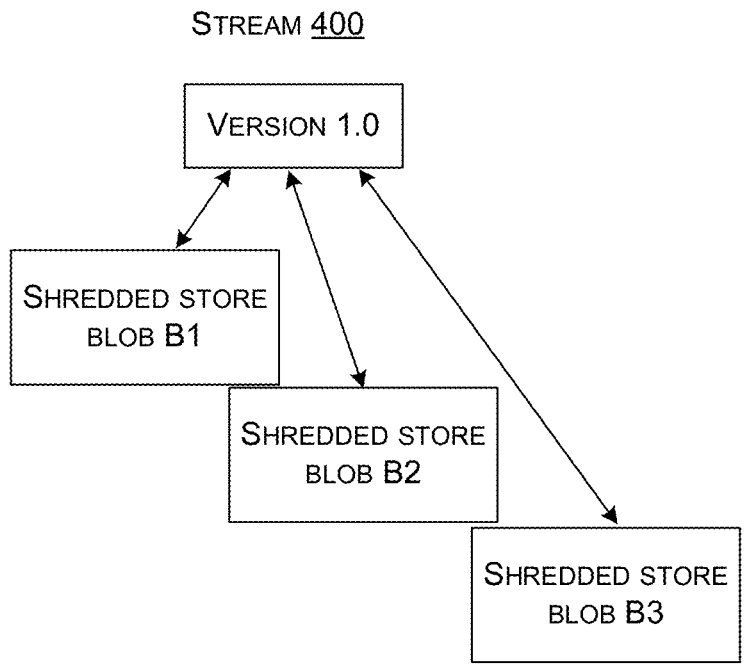
FIGS. 4-8 show data stream examples in accordance with some implementations of the present concepts.

FIG. 4 relates to a data stream 400. For purposes of explanation assume that the data stream is a historical version 1.0 of a file. The data stream for version 1.0 is represented as a collection of blobs B1-B3.

The relationship between the blobs and the version of the data stream is represented as two tables (table 4 and table 5). These tables can be stored in the storage index 302 and/or DEC 304 of FIG. 3, for example. Table 4 represents a forward links table and table 5 represents a backward links table.

TABLE 4

| Version of File | Blob Collection |
| --- | --- |
| 1.0 | (B1, B2, B3) |

TABLE 5

| Blob | Versions it is referenced by |
| --- | --- |
| B1 | (1.0) |
| B2 | (1.0) |
| B3 | (1.0) |

Figure 5:
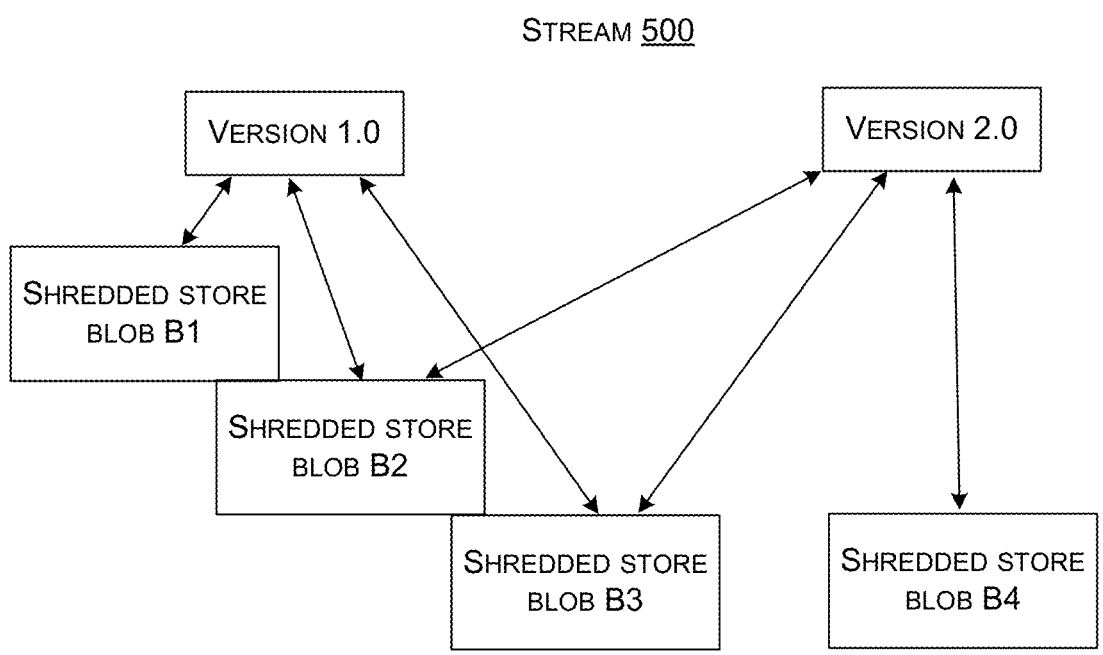

Since the blobs are immutable (i.e. cannot be changed), this implementation only needs to worry about new or removed references when data stream operations happen. As evidenced in FIG. 5 and represented relative to updated data stream 500, now assume that version 2.0 of the file is created where the edit resulted in removing the data for blob B1, and adding data for a new blob B4. The resulting logical and physical table changes are represented in tables 6 and 7. Table 6 can be thought of as an updated table 4 and table 7 can be thought of as an updated table 5.

TABLE 6

| Version of File | Blob Collection |
| --- | --- |
| 1.0 | (B1, B2, B3) |
| 2.0 | (B2, B3, B4) |

TABLE 7

| Blob | Versions it is referenced by |
| --- | --- |
| B1 | (1.0) |
| B2 | (1.0, 2.0) |
| B3 | (1.0, 2.0) |
| B4 | (2.0) |

At this point, a request for the data stream for version 1.0 could still be satisfied by retrieving blobs (B1, B2, B3) and a request for data stream version 2.0 could still be satisfied by retrieving blobs (B2, B3, B4). The only physical data operations required were to create the new B4 blob and update the two tables of forward and backward links. Normally creating version 2.0 of the file would have required a copy of blobs (B2, B3) in addition to creating the new B4 blob.

Figure 6:
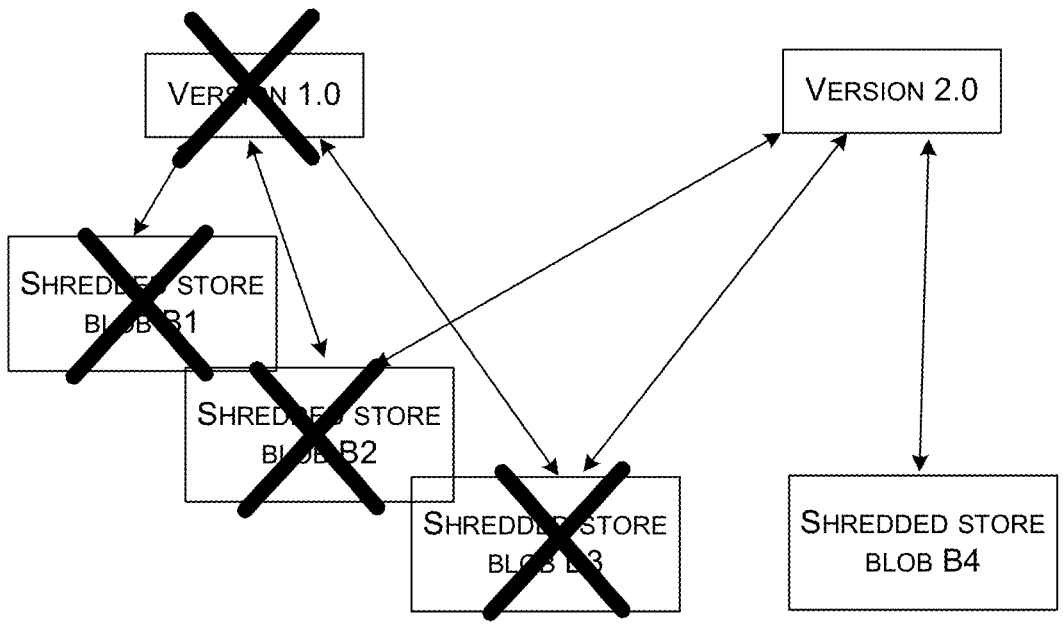
Figure 7:
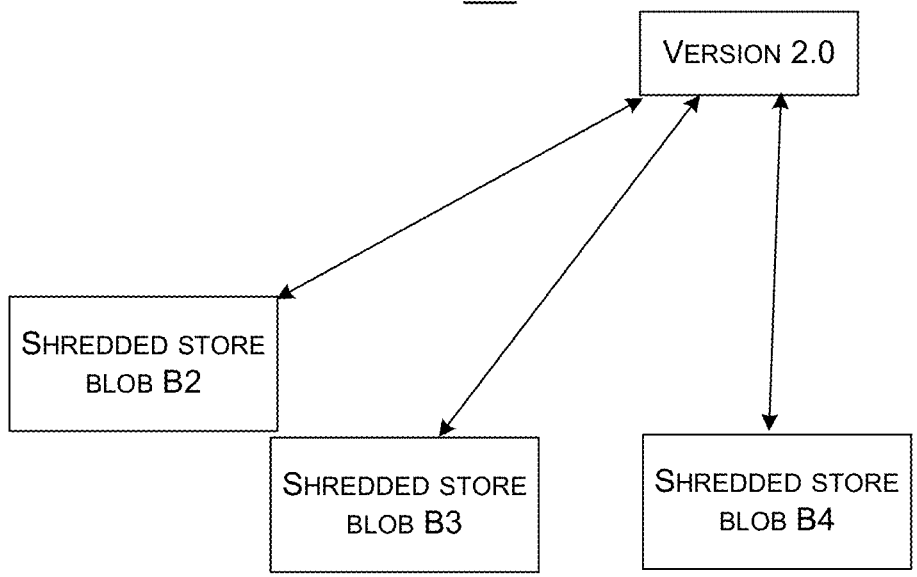

Now consider a delete of version 1.0 and its data stream 600 as represented by FIG. 6. The intermediate logical state includes several elements. First, logically blobs (B1, B2, B3) need to be deleted. However, the present techniques can use the backward links table (e.g., table 7) and see that blob B2 and B3 are still referenced by another version (2.0), so they cannot be physical deleted. However, blob B1 is only referenced by data stream version 1.0, so that blob can be safely deleted (all of these operations can be done in an atomic operation to guarantee two operations to the same file (for any version) do not conflict with each other. After deleting version 1.0, the resulting logical and physical state is represented by FIG. 7 by data stream 700 and in tables 8 and 9.

TABLE 8

| Version of File | Blob Collection |
| --- | --- |
| 2.0 | (B2, B3, B4) |

TABLE 9

| Blob | Versions it is referenced by |
| --- | --- |
| B2 | (2.0) |
| B3 | (2.0) |
| B4 | (2.0) |

Figure 8:
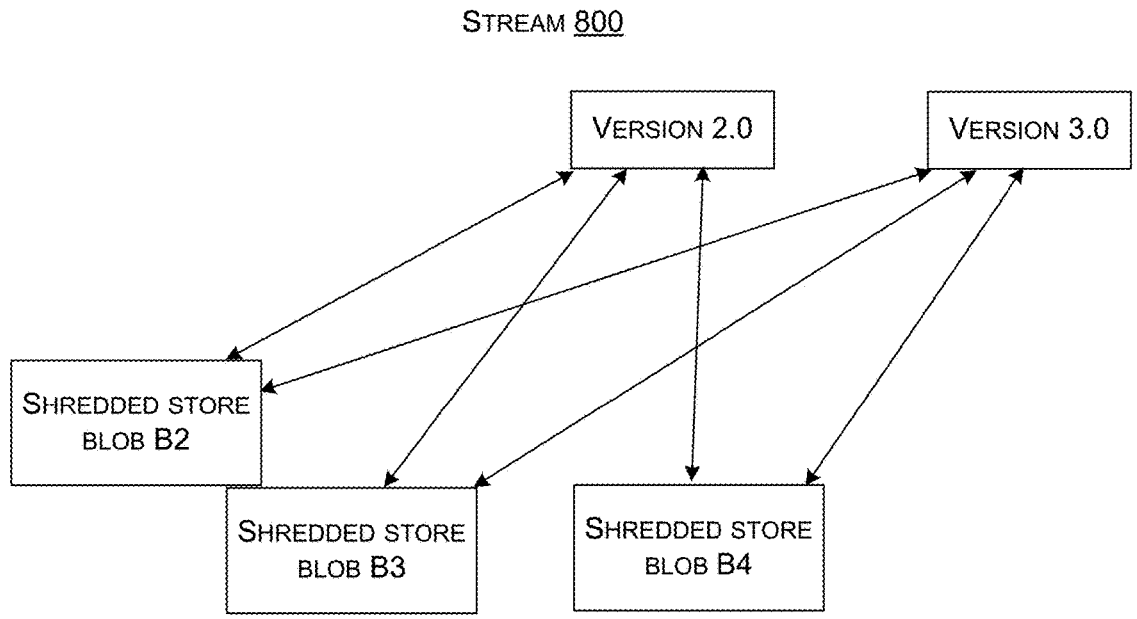

This can also be applied to duplicating a version where normally a physical copy is made, but the present techniques can simply copy the references. FIG. 8 and tables 10 and 11 show a copy of version 2.0's data stream to version 3.0 as indicated at 800.

TABLE 10

| Version of File | Blob Collection |
| --- | --- |
| 2.0 | (B2, B3, B4) |
| 3.0 | (B2, B3, B4) |

TABLE 11

| Blob | Versions it is referenced by |
| --- | --- |
| B2 | (2.0, 3.0) |
| B3 | (2.0, 3.0) |
| B4 | (2.0, 3.0) |

Example SharePoint® Implementation

Figure 9:
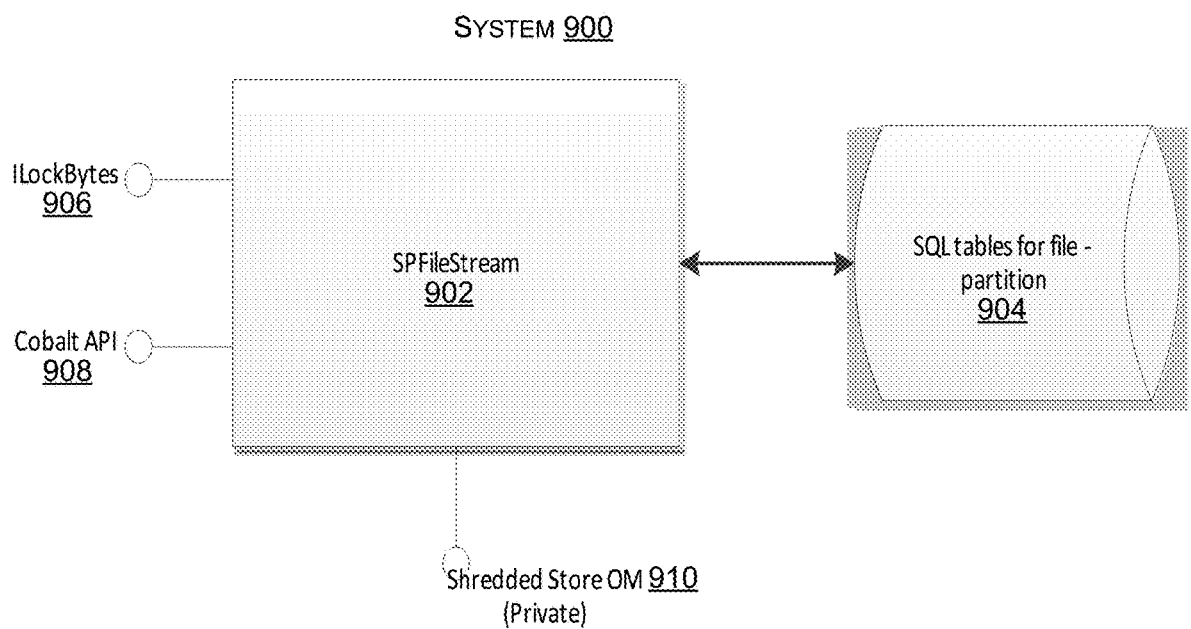

The following discussion relates to an example implementation of shredded storage relative to SharePoint. One such example is illustrated in FIG. 9. In this case system 900 includes a SPFileStream 902. The SPFileStream 902 can represent the state of a file-partition (e.g., SQL tables for file partition 904). The object can expose interfaces for accessing the file-partition content as either a traditional data stream (ILockBytes) 906 or through a ms-fsshttp query changes/put changes API 908. The access interfaces are intended to be coherent and meet SharePoint performance requirements.

The state exposed by SPFileStream 902 may be modified by clients performing write calls through appropriate access interfaces (i.e. ILockBytes, WriteAt/Ms-fsshttp PutChanges). Changes can be buffered internally within the SPFileStream's state and are only written to the back-end store when a commit method (with coherency) is explicitly called. Pending changes may also be rolled back completely by calling an 'abort' method. Internally the SPFileStream object can expose a private API set (e.g., shredded store OM 910) for accessing the shredded blob store tables.

Figure 10:
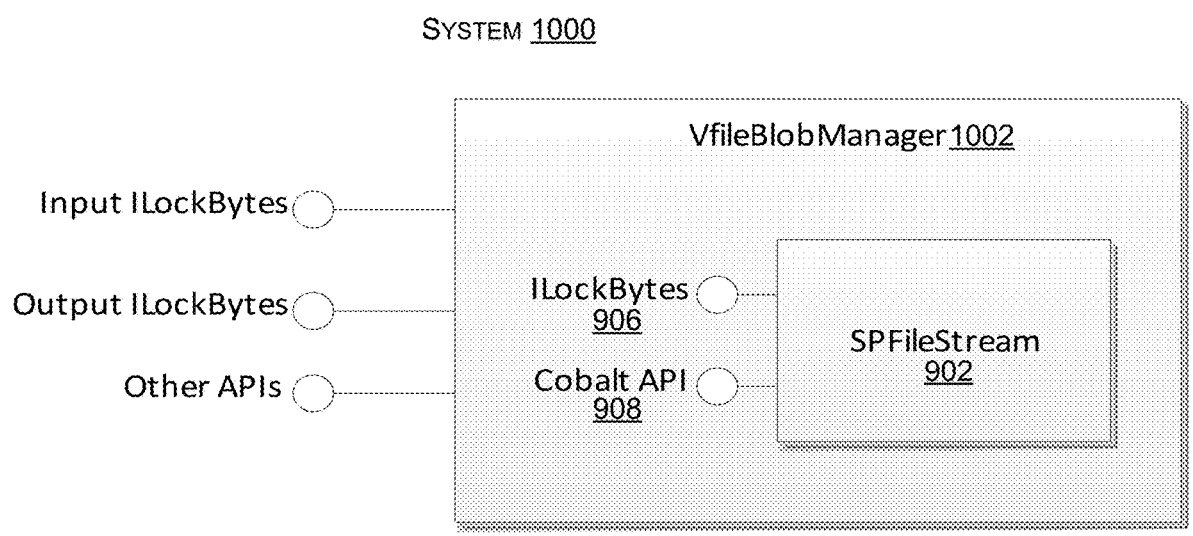

FIG. 10 shows a system 1000 that includes a representation of VfileBlobManager 1002. The VfileBlobManager can provide abstraction for access and modification of file contents in cooperation with SPFileStream 902 while maintaining its API semantics.

Windows SharePoint Services (WSS) can create the initial SPFileStream class with an ILockBytes implementation that simply reads the full file (e.g., data) stream, via the SPCoordinatedStreamBuffer and SPBackgroundFileFiller. WSS can integrate the SPFileStream class into the VfileBlobManager. WSS can implement the private shredded back-end API on SPFileStream and the required SQL table schema changes. In this implementation, the first blob fetched from the back-end store contains the generic FDA (file data adapter) graph minus the payload and the first few bytes (for example 100 KB) of the file. This configuration can avoid loading the DEC. Datastore blobs can be painted with the metadata that facilitates performing the initial query. ("FDA" can be thought of as a portion of code that knows how to break up a file into chunks and put them back together again. Different file types can have different FDAs. For instance, one FDA can handle text files and another FDA can handle zip files).

Various elements of a shredded store system employing ms-fsshttp as an incremental protocol are described above. Recall that other incremental protocols can take advantage of the present shredded store concepts. One such incremental protocol is BITS (background intelligent transfer system). In this example, BITS can employ several primitives that are discussed here. These primitives can include 'create session', 'add fragment', 'commit', and 'clear'. 'Create session' can be utilized to start a session relating to a file. The file can be represented by a control blob that includes metadata and one or more fragments of the file data. The create session primitive creates the control blob. The add fragment primitive is used to delete the existing control blob and add a new control blob and a new fragment. The session can conclude by the commit primitive or aborting the changes via the clear primitive. In some configurations, the add fragment primitive can include blob aggregation for datastore-side write operations. Other simpler configurations do not employ blob aggregation. In either case, these implementations can benefit from shredded store so that file operations are generally more proportional to the size of the file change fragment rather than the size of the file.

System Example

Figure 11:
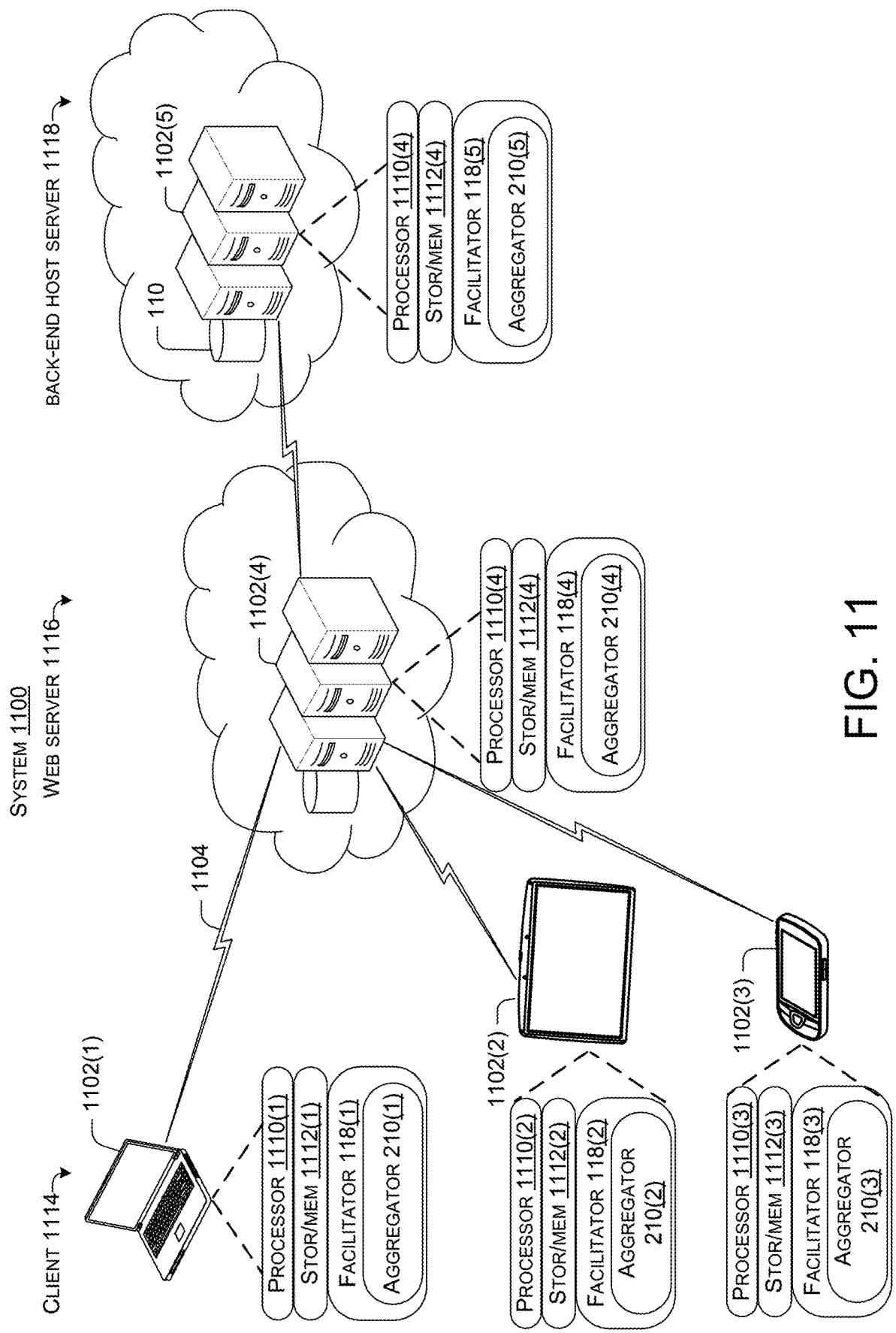

FIG. 11 illustrates a data management or data handling system 1100. In this example, the data management system 1100 includes several devices 1102. In this case, the devices are manifest as a notebook type computer 1102(1), a pad type computer 1102(2), a smartphone type computer 1102(3), and two sets of server type computers 1102(4) and 1102(5) that may or may not be cloud-based. (In this discussion, the use of a designator with the suffix, such as "(1)", is intended to refer to a specific device instance. In contrast use of the designator without a suffix is intended to be generic). Of course not all device implementations can be illustrated and other device implementations should be apparent to the skilled artisan from the description above and below.

The devices 1102 can communicate over one or more networks 1104 (represented by 'lightning bolts'). In this example computing device 1102(5) can include database or datastore 110. In some cases, some or all aspects of the present concepts can be implemented by an individual device 1102 acting in isolation. In other cases, a device can implement the present concepts by operating cooperatively with one or more other devices and/or the datastore 110. These variations are described in more detail below.

Devices 1102 can include several elements which are defined below. For example, these devices can include a processor 1110, storage/memory 1112, and/or a facilitator component 118. The facilitator component 118 can include an aggregator module (e.g., aggregator) 210. The devices can alternatively or additionally include other elements, such as input/output devices (e.g., touch, voice, and gesture), buses, graphics cards, etc., which are not illustrated or discussed here for sake of brevity.

The term "device", "computer" or "computing device" as used herein can mean any type of device that has some amount of processing capability and/or storage capability. Processing capability can be provided by one or more processors (such as processor 1110) that can execute data in the form of computer-readable instructions to provide a functionality. Data, such as computer-readable instructions, and/or user-related data, can be stored on storage, such as storage/memory 1112 that can be internal or external to the computer. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In the illustrated implementation, devices 1102 are configured with a general purpose processor 1110 and storage/memory 1112. In some configurations, a device can include a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPU), graphical processing units (GPUs), controllers, microcontrollers, processor cores, or other types of processing devices suitable for implementation both in conventional computing architectures and/or SOC designs.

In some configurations, the facilitator component 118 and/or the aggregator module 210 can be installed as hardware, firmware, or software during manufacture of the device or by an intermediary that prepares the device for sale to the end user. In other instances, the end user may install the facilitator component 118 and/or the aggregator module 210, such as in the form of a downloadable application.

Examples of devices can include traditional computing devices, such as personal computers, desktop computers, servers, notebook computers, cell phones, smart phones, personal digital assistants, pad type computers, mobile computers, cameras, or any of a myriad of ever-evolving or yet to be developed types of computing devices. A mobile computer can be any type of computing device that is readily transported by a user and may have a self-contained power source (e.g., battery). Aspects of system 1100 can be manifest on a single device or distributed over multiple devices.

For purposes of explanation, system 1100 can be thought of as entailing a client-side 1114, a web server side 1116, and a back-end host server side 1118. An instance of the facilitator component 118 and the aggregator module 210 are shown on each device in the illustrated configuration. In some configurations, less than all of the devices may have an instance of the facilitator component 118 and/or the aggregator module 210. For instance, an alternative system could have an instance on the web server side 1116, and the devices of the client-side 1114 and the back-end host server side 1118 could interact with the facilitator component 118(4) and/or the aggregator module 210(4) via one or more APIs.

The client-side devices 1114 may have applications running thereon or may interact with web-based applications. In either case, these applications may want to access files stored on datastore 110 of device 1102(5). The facilitator component 118(4) and/or the aggregator module 210(4) running on the web server side 1116 can facilitate accessing the stored files on the back-end host server 1118 on behalf of the client-side devices 1114. The client side devices can act on the file to create new versions of the file.

The facilitator component 118(4) and/or the aggregator module 210(4) can also facilitate shredded storage of the versions of the file on the back-end host server 1118 as described above relative to FIGS. 1-11. For instance, recall that the datastore 110 (and/or the back-end host server 1118) can define a target size of the datastore blobs. The facilitator component 118(4) and/or the aggregator module 210(4) can package the revisions in individual datastore blobs in a manner that groups revised data together in one or more datastore blobs that approach the target size. The facilitator component 118(4) and/or the aggregator module 210(4) can map individual datastore blobs to individual revisions. Thus, subsequent client-side requests for individual versions can be satisfied from the mapping by associating mapped blobs of the version in a mapped (e.g., specified) order.

Method Examples

Figure 12:
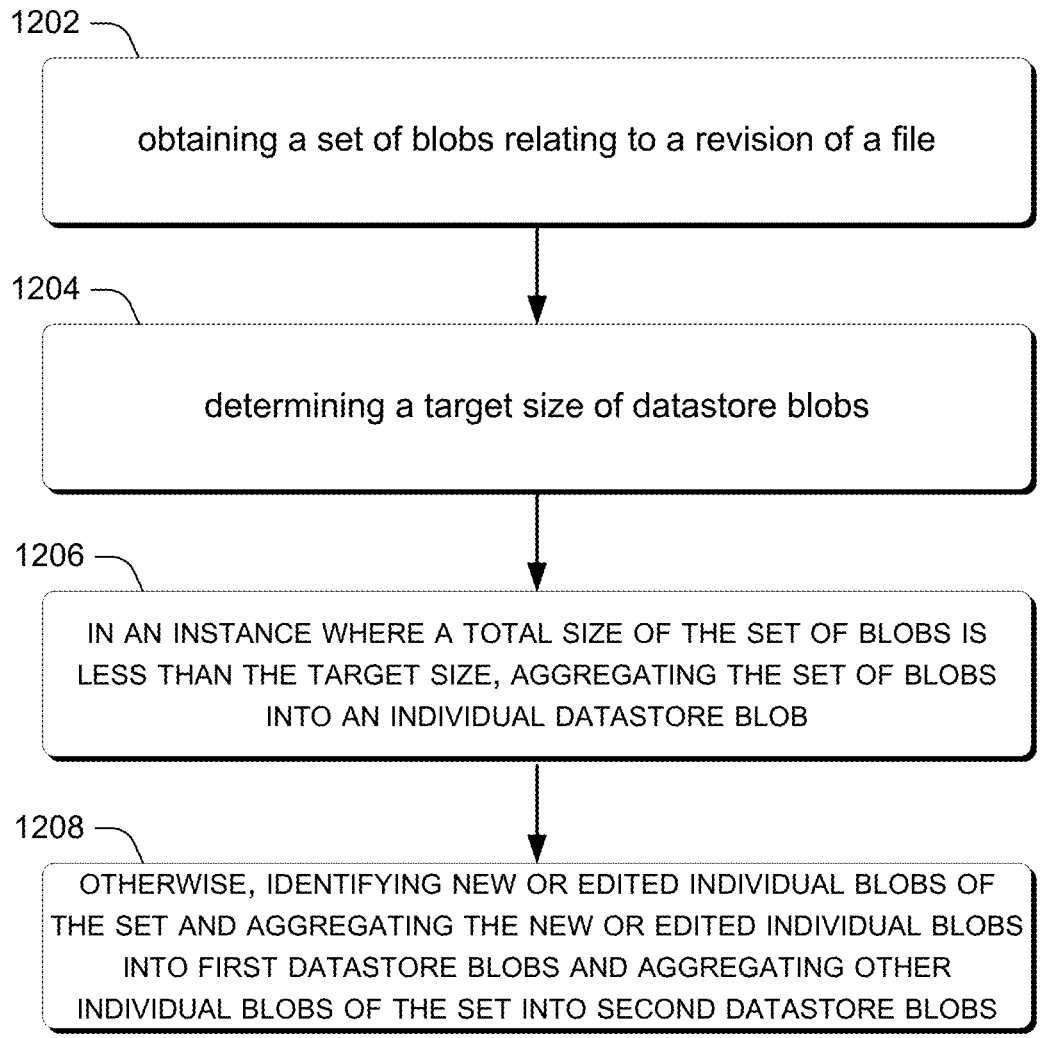
FIGS. 12-13 are flowcharts of examples of data handling techniques in accordance with some implementations of the present concepts.

FIG. 12 shows a flowchart of a method 1200 for managing data. Method 1200 can be performed by the devices or systems introduced above or by other devices or systems.

The method can obtain a set of blobs relating to a revision of a file at 1202.

The method can determine a target size of datastore blobs at 1204.

The method can aggregate the set of blobs into an individual datastore blob in an instance where a total size of the set of blobs is less than the target size at 1206.

Otherwise, the method can identify new or edited individual blobs of the set and aggregate the new or edited individual blobs into first datastore blobs and aggregate other individual blobs of the set into second datastore blobs at 1208.

Figure 13:
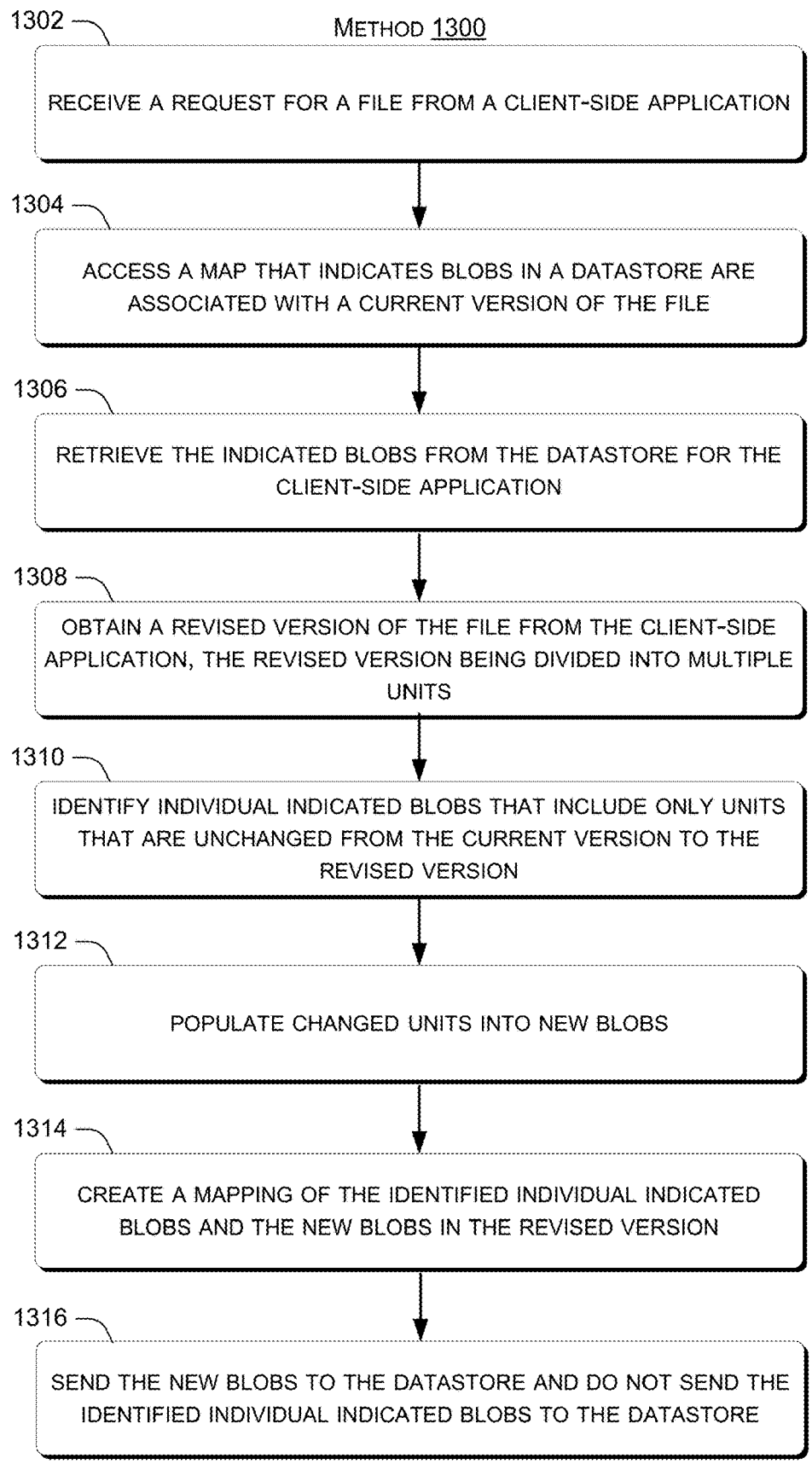

FIG. 13 shows a flowchart of a method 1300 for managing data. Method 1300 can be performed by the devices or systems introduced above or by other devices or systems.

The method can receive a request for a file from a client-side application at 1302.

The method can access a map that indicates blobs in a datastore that are associated with a current version of the file at 1304.

The method can retrieve the indicated blobs from the datastore for the client-side application at 1306.

The method can obtain a revised version of the file from the client-side application. The revised version can be divided into multiple units at 1308.

The method can identify individual indicated blobs that include only units that are unchanged from the current version to the revised version at 1310.

The method can populate changed units into new blobs at 1312.

The method can create a mapping of the identified individual indicated blobs and the new blobs in the revised version at 1314.

The method can send the new blobs to the datastore and not send the identified individual indicated blobs to the datastore at 1316.

The order in which the methods are described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on computer-readable storage medium/media as a set of instructions such that execution by a computing device causes the computing device to perform the method.

CONCLUSION

Although techniques, methods, devices, systems, etc., pertaining to managing data are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method performed by a computing device, the method comprising:
   receiving, at the computing device, a set of multiple client-side data units individually having a client-side unit size from a client-side device, the multiple client-side data units individually being a part of a file revised at the client-side device;
   determining whether a total size of the set of multiple client-side data units is larger than a datastore blob target size of datastore blobs in a datastore; and
   in response to determining that the total size of the set of multiple client-side data units is greater than the datastore blob target size,
       identifying a first subset of the client-side data units that are new or revised in comparison with an existing version of the file in the datastore;
       aggregating the first subset of new or edited client-side data units into one or more first datastore blobs each having a size not exceeding the datastore blob target size;
       storing the aggregated one or more first datastore blobs in the datastore;
       identifying one or more second datastore blobs existing in the datastore as corresponding to a second subset of the client-side data units that are unchanged; and
       updating a map in the datastore to indicate that a new version of the file contains the stored one or more first datastore blobs and the existing one or more second datastore blobs.

2. The method of claim 1 wherein receiving the set of multiple client-side data units includes receiving the set of multiple client-side data units individually having an indication of being new, edited, or unchanged.

3. The method of claim 1 wherein:
   receiving the set of multiple client-side data units includes receiving the set of multiple client-side data units individually having an indication of being new, edited, or unchanged; and
   identifying the first subset of the client-side data units includes identifying the first subset of the client-side data units based on the indications associated with the individual client-side data units.

4. The method of claim 1 wherein receiving the set of multiple client-side data units includes receiving the set of multiple client-side data units individually having a size smaller than the datastore blob target size.

5. The method of claim 1 wherein:
   receiving the set of multiple client-side data units includes receiving the set of multiple client-side data units individually having a size smaller than the datastore blob target size; and
   generating the one or more first datastore blobs includes grouping the first subset of the new or edited client-side data units into the one or more first datastore blobs individually having the size that approximates but not exceeding the datastore blob target size.

6. The method of claim 1 wherein storing the generated one or more first datastore blobs includes writing the generated one or more first datastore blobs in the datastore without writing the one or more second datastore blobs.

7. The method of claim 1 wherein identifying a first subset of the client-side data units includes comparing the received set of multiple client-side data units of the file with a previous version of the file in the datastore.

8. The method of claim 1 wherein:
the one or more first and second datastore blobs individually having a storage index; and
updating the map includes updating the storage indices associated with the new version of the file.

9. A method performed by a computing device, the method comprising:
upon receiving a file corresponding to multiple client-side data units from a client side device,
identifying a first subset of the multiple client-side data units that are new or revised in comparison with an existing version of the file in a cloud-based datastore and a second subset of the multiple client-side data units that have corresponding copies in one or more second datastore blobs already existing in the cloud-based datastore;
combining the client-side data units from the first subset of the client-side data units into one or more first datastore blobs, the first datastore blobs individually containing multiple client-side data units from the first subset and having a size that approximates but does not exceed a storage unit size in the cloud-based datastore;
storing the one or more first datastore blobs in the cloud-based datastore without writing the one or more second datastore blobs in the cloud-based datastore; and
updating a map in the cloud-based datastore to indicate that a new version of the file contains the one or more first datastore blobs written to the cloud-based datastore and the existing one or more second datastore blobs.

10. The method of claim 9 wherein receiving the file includes receiving the multiple client-side data units individually having an indication of being new, edited, or unchanged.

11. The method of claim 9 wherein:
receiving the set of multiple client-side data units includes receiving the set of multiple client-side data units individually having an indication of being new, edited, or unchanged; and
identifying the first subset includes identifying the first subset of the client-side data units based on the indications associated with the individual client-side data units.

12. The method of claim 9 wherein identifying the first subset includes identifying the first subset of the client-side data units by comparing the received set of multiple client-side data units of the file with a previous version of the file in the datastore.

13. The method of claim 9 wherein:
the one or more first and second datastore blobs individually include a storage index; and
updating the map includes updating the storage indices to indicate that the first and second datastore blobs are associated with the new version of the file.

14. The method of claim 9 wherein:
the datastore contains a previous version of the file having a third datastore blob not associated with the new version of the file; and
the method further includes:
determining whether the third datastore blob is associated with any other files in the datastore; and
in response to determining that the third datastore blob is not associated with any files in the datastore, deleting the third datastore blob from the datastore.

15. A computing device, comprising:
a processor; and
a memory containing instructions executable by the processor to cause the computing device to:
in response to receiving, from a client side device, a file corresponding to multiple client-side data units,
identify a first subset of the multiple client-side data units that are new or revised in comparison with an existing version of the file in a cloud-based datastore and a second subset of the multiple client-side data units that have corresponding copies in one or more second datastore blobs already existing in the cloud-based datastore, the cloud-based datastore storing the existing version of the file in multiple storage units individually having a storage unit size;
combine the client-side data units from the first subset of the client-side data units into one or more first datastore blobs, the first datastore blobs individually containing multiple client-side data units from the first subset and having a size that approximates but does not exceed the storage unit size;
store the one or more first datastore blobs in the cloud-based datastore without writing the one or more second datastore blobs in the cloud-based datastore; and
update a map in the cloud-based datastore to indicate that a new version of the file contains the one or more first datastore blobs written to the cloud-based datastore and the existing one or more second datastore blobs.

16. The computing device of claim 15 wherein the multiple client-side data units individually include an indication of being new, edited, or unchanged.

17. The computing device of claim 15 wherein:
the set of multiple client-side data units individually include an indication of being new, edited, or unchanged; and
to identify the first subset includes to identify the first subset of the client-side data units based on the indications associated with the individual client-side data units.

18. The computing device of claim 15 wherein to identify the first subset includes to identify the first subset of the client-side data units by comparing the received set of multiple client-side data units of the file with a previous version of the file in the datastore.

19. The computing device of claim 15 wherein:
the one or more first and second datastore blobs individually include a storage index; and
to update the map includes to update the storage indices to indicate that the first and second datastore blobs are associated with the new version of the file.

20. The computing device of claim 15 wherein:
the datastore contains a previous version of the file having a third datastore blob not associated with the new version of the file; and
the memory contains additional instructions executable by the processor to cause the processor to:
determine whether the third datastore blob is associated with any other files in the datastore; and
in response to determining that the third datastore blob is not associated with any files in the datastore, delete the third datastore blob from the datastore.

* * * * *